3,403,173
MANUFACTURE OF TETRAORGANOLEAD
Rolland K. Snuffer and Daniel E. Wiley, Corpus Christi,
Tex., assignors to Houston Chemical Corporation, New
York, N.Y., a corporation of Texas
No Drawing. Filed Sept. 21, 1965, Ser. No. 489,048
10 Claims. (Cl. 260—437)

ABSTRACT OF THE DISCLOSURE

An improvement in the manufacture of tetraorganolead is described which involves establishing and maintaining in a reaction zone of organo halide and lead alloy a small concentration of silver above about 50 p.p.m. basis the lead alloy over an extended period of time. Also described is operation of a reaction zone of organo halide and lead alloy in which there is established and maintained a small concentration above about 100 p.p.m. basis the weight of the alloy of combined silver and copper over an extended period of operation. Use of the process contributes to increased yields of tetraethyllead.

---

This application relates to the manufacture of tetraorganolead compounds. It more particularly relates to the production of tetraalkyllead by the reaction of alkyl chlorides with a sodium lead alloy in the presence of copper, silver, or mixtures thereof.

Tetraethyllead has been manufactured on a large scale for many years. It is a relatively expensive material to manufacture. Thus, even slight improvements in yield amounting to only a fraction of a percent are important commercially and economically. Similar increases in yields of other tetraorganolead compounds, notably tetramethyllead, are equally significant.

The conventional method for making tetraalkyllead today involves a chemical reaction which may be expressed by the following equation:

$$4NaPb + 4RCl \rightarrow R_4Pb + 4NaCl + 3Pb$$

The specific reaction which produces tetraethyllead may be expressed:

$$4NaPb + 4C_2H_5Cl \rightarrow (C_2H_5)_4Pb + 4NaCl + 3Pb$$

Other tetraorganolead compounds are produced in accordance with this equation by substituting another organo halide compound for all or part of the ethyl chloride. The organo halides within contemplation include the alkyl halides containing from 1 to 5 carbon atoms. Alkenyl halides, notably vinyl halide, and aryl halides, notably phenyl halide, may also be employed. The term "halide" includes the chlorides, bromides and iodides. The chlorides, e.g., methyl chloride, ethyl chloride, vinyl chloride, propyl chloride, butyl chloride and phenyl chloride, are preferred, primarily because of economic considerations.

Tetraorganoleads may be produced in either a batch or a continuous process. In either case, lead alloy and organo halides are repeatedly introduced to a reaction zone. Catalysts and/or solvents may also be introduced to the reaction zone. The reaction between the halide and the alloy produces product tetraorganolead. All or a portion of the reaction mass is removed from the reaction zone and product is recovered therefrom. Additional reactants are either periodically or continuously supplied to the reaction zone and product is either continuously or periodically recovered therefrom. Most of the lead introduced to the reaction zone is typically recovered from the reaction mass. This lead is usually remelted and used to make additional alloy. Such recovered lead is termed "recycle lead."

The present invention provides a method of increasing the yields of tetraorganolead compounds prepared according to the foregoing reaction. Although much of the detailed description and the specific examples relate to the production of tetraethyllead, it should be understood that the invention is also applicable to the production of other tetraorganoleads, notably tetramethyllead, tetravinyllead, tetrapropyllead, tetrabutyllead, tetraphenyllead, and mixed alkyls such as methyltriethyllead, dimethyldiethyllead, trimethylethyllead, ethyltripropyllead, diethyldipropyllead, triethylpropyllead, dimethyldipropyllead, dimethylethylpropyllead, etc.

In accordance with the present invention, it has been found that the yield of tetraethyllead by the reaction of lead alloy with ethyl chloride is increased by establishing and maintaining in the reaction zone a relatively high level of copper and/or silver. Minor amounts of these metals are often present in the alloys presently employed in the commercial production of tetraalkylleads.

Alloy presently employed in the commercial production of tetraalkyllead is typically prepared in batches. Lead and the other components of the alloy are melted and mixed together. The mixture is then solidified and comminuted to the desired particle size. A batch of alloy may be used for one or a plurality of alkylations.

The alloy typically contains about 1 mole of one or more alkali metals per mole of lead. Usually sodium is employed although lithium and/or potassium can be substituted for all or part of the sodium. The alloy may contain up to 4 moles of any one or any combination of these metals per mole of lead. The alloy may also contain other metals, notably calcium, either as major or minor constituents. This invention includes within its scope processes in which any lead alloy is reacted with organo halide to produce tetraorganolead. Lead monosodium alloy (NaPb), containing about 10 percent by weight sodium, is usually employed.

Most, usually 70 percent or more, of the lead contained in a batch of such an alloy is recycle lead. The remainder of the lead, normally referred to as make-up lead, may be entirely virgin lead or a mixture of virgin and secondary lead. By secondary lead is meant lead recovered from slag or other sources, e.g., storage batteries. Normally secondary lead comprises a small percentage of the make-up lead. Each of these lead sources may contribute silver and/or copper to the lead alloy and consequently to the reaction mass.

The silver and copper concentrations in the alloy vary considerably from batch to batch because of corresponding variations in concentration of these metals in the enumerated lead sources, particularly the recycle lead. Some silver and copper may be lost during the alkylation process. Substantial amounts of these metals are lost in the lead recovery operation. Recycle lead is typically collected in a sludge pit in admixture with water. Soluble silver and copper salts are lost in the aqueous phase when it is removed from the lead. Additional silver and copper are removed with the lead slag removed from the recycle lead furnaces. In one commercial operation, the silver content of the alloy averaged 66 parts per million (p.p.m.) and the copper content averaged 14 p.p.m., basis, the weight of the alloy over a year's operation. Nevertheless, individual batch analyses the succeeding year revealed silver concentrations as low as about 20 p.p.m. and copper concentrations as low as about 10 p.p.m. on the aforestated basis. Thus, whether a batch or continuous operation is employed, the amounts of silver and/or copper present in the reaction zone over an extended period of operation in accordance with present day commercial practice is highly variable. By "extended period of operation" is meant a period during which alloy from different batches is introduced to the reaction zone. In a batch process, the silver and copper concentrations in a reaction zone can be very high during one alkylation and very low in the next if the alloy charged to the zone for the second alkylation is from a different batch than the alloy charged to the zone for the first alkylation.

The silver and copper normally in the reaction zone as a result of present day commercial practice has now been recognized to desirably influence the yield of TEL. Thus, it has been discovered that the TEL yields obtainable when the reaction mass contains no significant amount of silver and/or copper are lower than those obtainable under similar reaction conditions when the reaction mass includes even small amounts, e.g., 10 p.p.m. of either or both of these metals based on the weight of the alloy. Further, according to this invention, substantial quantities of these metals are established and maintained in the reaction zone. Thus, according to the present invention, silver and/or copper concentrations higher than those naturally resulting from present day standard practice are purposely established and maintained in the reaction zone over an extended period of operation.

In an operation where the concentration of these metals in the reaction zone is consistently low, the deliberate increase in concentration of either or both metals in the reaction zone results in increased yields of tetraorganoleads. In an operation where the concentration of these metals would be expected to be periodically low under normal operating conditions, appropriate steps are taken to eliminate drastic drops in concentration.

Deliberate additions of as little as about 5 p.p.m. of either copper or silver to a typical process are effective to enhance the yield of tetraethyllead. Preferably, silver is present in the reaction zone in amounts of at least 50, more desirably at least 80 p.p.m., based on the weight of the alloy. Increasing the amount of silver present to higher concentrations further enhances the yield of TEL. Thus, in spite of the high cost of silver metal, quantities of silver in excess of 200 p.p.m., sometimes up to about 500 p.p.m., on the aforestated basis may be economically employable. The cost of even substantial additions of silver is more than offset by the value of the increased yield of TEL. Comparable concentrations of copper in the reaction mass are desirable. Due to the relatively low cost of copper, even greater additions of this metal are economically justified.

The improvement of this invention results when the concentration of either copper or silver is adjusted in accordance with the teachings of this disclosure. Maximum improvement is usually obtained by maintaining high concentrations of both metals in the reaction zone. In general, yields are improved by maintaining the concentration of both metals above about 50 p.p.m., preferably above about 80 p.p.m. Enhanced yield is also obtained by establishing and maintaining in the reaction zone a combined concentration of copper and silver of above about 100 p.p.m., preferably above about 130 p.p.m. Of course, improved yields are obtained by increasing the concentration of either copper or silver in the reaction mass even though the resulting concentration of either or both metals in the reaction mass is very low, e.g., about 10 to about 20 p.p.m.

The concentration of silver and/or copper in the reaction zone is conveniently adjusted by including the appropriate amounts of these metals in the alloy. Alternatively, these metals may be charged directly to the reaction zone either as metals or as metal salts reducible in the environment of the reaction zone. They may also be introduced with solvents or liquid alkylating agents. The most convenient way of introducing silver or copper to the alloy is to charge the metals to the melting or manufacturing pots used in the manufacture of the alloy. The metals may be introduced as free metals, reducible salts or in physically combined form. Most salts of copper or silver are readily reducible in the molten alloy or in the reaction zone. Selection of appropriate copper or silver salts depends primarily on their availability and cost. The halogen, oxygen, and nitrogen containing salts of copper and silver are employable. The chlorides, oxides, chlorates, nitrites, and nitrates are preferred. One particularly convenient way of increasing the levels of silver and/or copper in the alloy is to use secondary make-up lead containing high concentrations of these metals as impurities.

The invention is applicable when the reaction is conducted in the absence of a catalyst or in the presence of one or more of the catalysts otherwise employed in the production of tetraorganoleads, such as acetones, triphenylphosphite, the orthosilicates, notably tetraethylorthosilicate, aluminum chloride, aluminum alkyl halides, aluminium alloys in the presence of halogens, metallic aluminium and alkyl ethers, notably ethyl ether. Solvents such as n-hexane, toluene, kerosene, benzene, pentane, or any other suitable inert liquid, particularly inert hydrocarbon liquids may also be present. Excess organo halids may also be employed as all or part of the solvent.

In the following examples, the alloy employed was lead monosodium alloy with a typical screen analysis as follows:

| Screen: | Weight percent |
|---|---|
| ¼-inch mesh | 8±6 |
| ⅛-inch mesh | 53±8 |
| 40-inch mesh | 28±4 |
| 100-inch mesh | 7±4 |
| Pan | 2±2 |

EXAMPLE I

A batch of alloy was prepared containing about 135 parts by weight of silver per million parts by weight of the alloy. 3600 pounds of this alloy was charged from a hopper into a horizontal commercial TEL autoclave. The autoclave was provided with a heavy duty plow type agitator. 260 gallons of ethyl chloride was fed to the autoclave over a period of 1 hour. The ethyl chloride was fed at an approximately constant rate. The autoclave pressure was maintained at about 75 p.s.i.g. About 7 minutes was required for the autoclave pressure to rise to the control point of 75 p.s.i.g. after the initiation of ethyl chloride feed. The average reactor vapor space temperature was held at about 156° F. At the end of the 1 hour ethyl chloride addition period, the autoclave was vented to about 50 p.s.i.g. over a 5 minute "cook" period. Following the cook period, the autoclave was vented to atmospheric pressure. Following the ethylation, the amount of sodium consumed in side reactions and the amount of unreacted sodium were determined. The sum of these percentages was about 8.2. The tetraethyllead yield was thus considered to be about 91.8 percent of theoretical.

EXAMPLE II

A batch of alloy containing about 41 p.p.m. copper and about 103 p.p.m. silver was prepared. 4400 pounds of this alloy were charged to the autoclave of Example I. 320 gallons of ethyl chloride were fed at an approximately constant rate to the autoclave over a period of about 40 minutes. The autoclave pressure was set and maintained at about 90 p.s.i.g. About 4 minutes was required for the pressure to reach this level after initiation of ethyl chloride feed. The average reactor vapor space temperature was about 175° F. At the end of the ethyl chloride feed, the autoclave was vented to about 50 p.s.i.g. over a 25 minute cook period after which the autoclave was vented to atmospheric pressure. The tetraethyllead yield was determined in accordance with the procedure followed in Example I to be about 94.0 percent of theoretical.

EXAMPLE III

The procedure of Example I is repeated except that an alloy containing about 100 p.p.m. copper is prepared and substituted for that employed in Example I. A yield of tetraethyllead in excess of 90 percent of theoretical is obtained.

The invention is not intended to be limited by the specific details referred to in the disclosure except to the extent those details are included in the accompanying claims.

We claim:

1. In the process of preparing tetraorganoleads by repeatedly providing as reactants to a reaction zone organo halide and lead alloy, reacting said reactants in said zone to produce tetraorganolead and recovering the tetraorganolead from said reaction zone, the improvement which comprises establishing and maintaining in said zone over an extended period of operation a small concentration of silver above 50 parts per million based on the weight of the alloy.

2. The method of calim 1, wherein the concentration of silver is established and maintained above about 80 parts per million based on the weight of the alloy.

3. In the process of preparing tetraorganoleads by repeatedly providing as reactants to a reaction zone organo halide and lead alloy, reacting said reactants in said zone to produce tetraorganolead and recovering the tetraorganolead from said reaction zone, the improvement which comprises adding to said reaction zone small small amounts of silver and copper, in addition to the silver and copper content normally present in the said alloy.

4. The method of claim 1 wherein the small concentration of silver is above 50 parts per million based on the weight of the alloy up to about 500 p.p.m.

5. In the process of preparing tetraalkylleads by repeatedly providing as reactants to a reaction zone alkyl halide and lead alloy, reacting said reactants in said zone to produce tetraalykyllead and recovering the tetraalkyllead from said reaction zone, the imrpovement which comprises establishing and maintaining in said zone over an extended period of operation a small combined concentration of silver and copper above 100 p.p.m.

6. In the process of preparing tetraalkylleads by repeatedly providing as reactants to a reaction zone alkyl halide and lead alloy, reacting said reactants in said zone to produce tetraalkyllead and recovering the tetraalkyllead from said reaction zone, the improvement which comprises establishing and maintaining in said zone over an extended period of operation a small combined concentration of silver and copper above 130 p.p.m.

7. The improvement of claim 5 wherein the alkyl halide is methyl or ethyl halide and the tetraalkyllead is tetramethyllead or tetraethyllead.

8. The improvement of claim 6 wherein the alkyl halide is methyl or ethyl halide and the tetraalkyllead is tetramethyllead or tetraethyllead.

9. The improvement of claim 7 wherein the halide is a chloride.

10. The improvement of claim 8 wherein the halide is a chloride.

References Cited

UNITED STATES PATENTS

| 2,270,109 | 1/1942 | Calingaert et al. | 260—437 |
| 2,414,058 | 1/1947 | Pearsall | 260—437 |
| 2,621,200 | 12/1952 | Kolka et al. | 260—437 |
| 2,688,628 | 9/1954 | Shapiro et al. | 260—437 |

TOBIAS E. LEVOW, *Primary Examiner.*

H. M. S. SNEED, *Assistant Examiner.*